United States Patent Office 3,507,933
Patented Apr. 21, 1970

3,507,933
**SELF-EXTINGUISHING POLYESTER COMPOSI-
TIONS OF 2,2-BIS(BROMOMETHYL)-1,3-PRO-
PANEDIOL AND METHOD OF MAKING THE
SAME**
Eric R. Larsen, Midland, and Bernard R. Andrejewski,
Auburn, and Donald L. Nelson, Midland, Mich., assignors to The Dow Chemical Company, Midland,
Mich., a corporation of Delaware
No Drawing. Filed Mar. 3, 1967, Ser. No. 620,283
Int. Cl. C08f 21/00, 21/02
U.S. Cl. 260—869                             4 Claims

ABSTRACT OF THE DISCLOSURE

Liquid compositions capable of curing to insoluble, infusible cross-linked flame-retardant products, and comprising blends of:
(1) a polyester of 2,2-bis(bromomethyl)-1,3-propanediol and an unsaturated dicarboxylic acid or anhydride
(2) a non-halogen containing polyester of an aliphatic polyol and an unsaturated dicarboxylic acid or anhydride, and
(3) a monovinyl aromatic compound and/or a lower alkyl ester of acrylic or methacrylic acid, e.g., styrene and/or methyl methacrylate.

---

This invention concerns self-extinguishing polyester compositions and a method of making the same. It relates more particularly to liquid compositions comprising polyesters of unsaturated aliphatic dicarboxylic acids and 2,2-bis(bromomethyl)-1,3-propanediol in admixture with ethylenically unsaturated monomers and pertains to the insoluble, infusible, cross-linked or cured products.

It is known to prepare halogen-containing polyesters by reacting an unsaturated alpha,beta-ethylenically unsaturated acid or its anhydride with a halogenated polyol or glycol, and that such unsaturated polyesters are reactive with olefinic monomers such as styrene, divinylbenzene, methyl methacrylate, diallyl phthalate and the like to form polymerized insoluble, infusible cross-linked products.

It has now been discovered that bromine-containing polyester compositions that are capable of curing to insoluble cross-linked flame-retardant to self-extinguishing products can readily be prepared by blending a polyester of 2,2-bis(bromomethyl)-1,3-propanediol and an aliphatic unsaturated dicarboxylic acid with a vinyl aromatic monomer or an ester of acrylic or methacrylic acid and another non-halogen-containing unsaturated polyester in proportions and kind as hereinafter defined.

The bromine-containing polyester can be prepared by reacting 2,2-bis(bromomethyl)-1,3-propanediol with an approximate chemically equivalent proportion of a mixture of at least one aliphatic monoethylenically unsaturated dicarboxylic acid or its anhydride having from 4 to 5 carbon atoms in the molecule and an aromatic or carbocyclic dicarboxylic acid or anhydride, in which mixture the ratio of the aliphatic dicarboxylic acid to the aromatic or carbocyclic dicarboxylic acid may range from 3:1 to 1:2. Among suitable aliphatic unsaturated dicarboxylic acids and anhydrides are maleic acid, maleic anhydride, fumaric acid, itaconic acid, citraconic acid and citraconic anhydride. Among suitable aromatic and carbocyclic dicarboxylic acids and anhydrides are phthalic anhydride, tetrahydrophthalic acid, and hexa hydrophthalic acid. Mixtures of approximately equal molar proportions of maleic anhydride and phthalic anhydride are preferred.

The unsaturated bromine-containing polyester of 2,2-bis(bromomethyl)-1,3-propanediol is employed in admixture with one or more non-halogen containing unsaturated polyesters of an unsaturated dicarboxylic acid or anhydride or a mixture of such acid or anhydride and an aromatic or carbocyclic dicarboxylic acid and a glycol such as propylene glycol, dipropylene glycol, or 2,2-dimethyl-1,3-propanediol. Mixtures of such diols or mixtures of any one of such diols and up to an equal weight of a higher polyol such as glycerol or pentaerythritol can also be used to prepare the non-halogen containing polyesters to be used in the compositions of the invention. In general, any unsaturated non-halogen containing polyester can be used, but non-halogen containing polyesters of the dicarboxylic acids and anhydrides and the polyols just described are preferred.

It may be mentioned that compositions prepared from blends of the bromine-containing polyester resins and the non-halogen-containing polyesters just described and cured to insoluble infusible products with monomers such as vinyl aromatic compounds or alkyl esters of acrylic or methacrylic acid possess good mechanical properties, are flame retardant to self-extinguishing, and are highly resistant to discoloring upon prolonged exposure to light.

The monoethylenically unsaturated monomer to be employed as the olefinc cross-linking agent can be a vinyl or a vinylidene monomer such as styrene, vinyltoluene, vinylxylene, ethylvinylbenzene, isopropylstyrene, tert.-butylstyrene, fluorostyrene, chlorostyrene, dichlorostyrene, bromostyrene, ethyl acrylate, methyl methacrylate, butyl methacrylate, 2-ethylhexyl acrylate, propyl acrylate, isobutyl acrylate, methyl acrylate, butyl methacrylate, or mixtures of any two or more of such vinyl or vinylidene compounds. The vinly aromatic monomers have the general formula

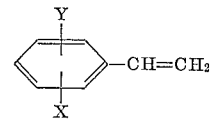

wherein X and Y each represent a member of the group consisting of hydrogen, halogen, and alykyl radicals having from 1 to 4 carbon atoms.

The aliphatic ester monomers have the general formula

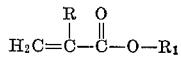

wherein R is a member of the group consisting of hydrogen and the methyl radical and $R_1$ is an akyl radical having from 1 to 8 carbon atoms. The ethylenically unsaturated monomer is employed in an amount of from 25 to 60 percent by weight of the composition.

The bromine-containing unsaturated polyester of 2,2-bis(bromomethyl)-1,3-propanediol can be used in amounts corresponding to from 10 to 40 percent by weight of the composition and sufficient to provide a total of from 5 to 15 percent by weight of bromine in the product.

The non-halogen-containing unsaturated polyester can be used in amounts of from 30 to 60 percent by weight of the composition.

Best results are usually obtained by employing approximately a stoichiometric proportion of the monomer, i.e. about one gram molecular proportion of the monomer for each gram equivalent ethylenic double bond in the polyesters initially used.

A preferred procedure for making the compositions of the invention comprises introducing the selected ingredients, i.e. the 2,2 - bis(bromomethyl) - 1,3 - propanediol and the unsaturated aliphatic dicarboxylic acid, or mixture of such acid and an aromatic dicarboxylic acid, to be esterified, in the predetermined proportions, into a suitable esterification reaction vessel equipped with heating and/or cooling means, an agitator, means for maintaining an atmosphere of an inert gas such as nitrogen, helium, or carbon dioxide, over the reaction mixture, means for removing water of esterification, suitably as it is formed in the reaction, and other accessories to the reaction. The reactants are blanketed with an inert atmosphere, preferably nitrogen gas, then agitated and heated to effect the reaction for a desired period of time. The degree of reaction is conveniently determined by employing the acid number technique or by measuring the amount of water liberated in the reaction. The reaction is discontinued when the product has a desired acid number, e.g. an acid number of 40 or below. The bromine-containing polyester is cooled and may be thereafter mixed with a non-halogen-containing unsaturated polyester prepared in a similar way and the olefinic monomer, at room temperature or thereabout, and in the desired proportions.

Alternatively, the unsaturated bromine-containing polyester can be advantageously mixed with the olefinic monomer at elevated temperatures, thereby facilitating solution and mixing of the materials with one another. To prevent premature polymerization at this stage, a polymerization inhibitor is advantageously added to the mixture or to one of the components of the mixture prior to mixing, especially if the mixture is to be stored, or shipped in commerce, prior to its being cured or polymerized to an insoluble, infusible, polyester resinous product. The curing is usually effected in the presence of a catalyst or initiator for the polymerization such as an organic peroxygen compound, e.g. benzoyl peroxide, tert.-butyl hydroperoxide, di-tert.-butyl peroxide, dicumyl peroxide, tert.-butyl peracetate, tert.-butylperbenzoate, di-tert.-butyl diperphthalate, tert.-butyl peroxy isopropyl carbonate, or bisisobutyronitrole. The activators or catalysts can be employed in amounts of from 0.01 to about 5 percent by weight of the monomers.

The polymerizable or curable polyester compositions of the invention are useful as intermediates or starting materials in the preparation of other and more complex polyester compositions, e.g. in the preparation of lacquers, or varnish resins, or enamels, but are preferably and advantageously employed as compositions of polymerizable polyesters comprising the unsaturated bromine-containing polyester in amount sufficient to form a self-extinguishing product when mixed with one or more other ethylenically unsaturated non-halogen-containing polyesters, which total polyester ingredients are intimately blended or mixed with one or more olefinic monomers copolymerizable with the unsaturated polyesters, to form insoluble, infusible, resinous products. Such compositions and products are useful for a variety of purposes in the home and industry such as the preparation of glass fiber or glass cloth reinforced laminates, as potting resins, as electrical insulating resins, as coatings for wood, metal or plastic objects, and which compositions possess good resistance to discoloring upon exposure to light and range from fire-retardant to self-extinguishing products.

Small amounts of additaments such as pigments, dyes, anti-oxidants, stabilizers or plasticizers, e.g. triethyl phosphate, can be added, but are not required.

The following examples illustrate ways in which the principle of the invention has been applied but are not to be construed as limiting its scope.

EXAMPLE 1

(A) A charge of 1310 grams (5 moles) of 2,2-bis-(bromomethyl) - 1,3 - propanediol; 220.5 grams (2.25 moles) of maleic anhydride; 333 grams (2.25 moles) of phthalic anhydride; and 350 ml. of ortho-xylene as solvent and reaction medium was placed in a glass reaction vessel equipped with a reflux condenser, a trap for the removal of water from the reaction by azeotropic distillation, and a stirrer. The mixture was stirred and was heated at refluxing temperatures of from 150°–163° C. for a period of 5.5 hours. A total of 51 ml. of water was separated from the reaction mixture by azeotropic distillation. The reacted mixture had an acid number of 21.6. The ortho-xylene solvent was separated from the product by heating the reacted mixture to a temperature of 170° C. at absolute pressures ranging from atmospheric to vacuum, e.g. about 5 millimeters or lower. A total of 341 ml. of ortho-xylene was recovered. The resin product was cooled to about 140° C., after which 0.09 gram of hydroquinone (anti-oxidant) and 624 grams (6 moles) of styrene were added. The resulting mixture contained 33 percent by weight bromine and 25.6 percent styrene. The polyester resin-styrene mixture is identified herein as Resin A.

(B) A charge of 760 grams (10 moles) of propylene glycol; 441 grams (4.5 moles) of maleic anhydride; 672 grams (4.5 moles) of phthalic anhydride; and 0.466 gram of triphenyl phosphite was placed in the glass reaction vessel employed in part A above. The mixture was stirred and heated at a temperature of 155° C. for a period of 1.5 hours, then was stirred and heated at 192° C. for a period of 21 hours. Water was separated from the reaction mixture by distilling and was condensed and removed. There was removed 160 ml. of water. The residue had an acid number of 33. It was cooled to about 140° C. after which 1.385 grams of hydroquinone and 800.8 grams (7.7 moles) of styrene were added. The resulting mixture contained 32 percent by weight styrene and 68 percent polyester. This mixture is identified herein as Resin B.

(C) A charge of 200 grams of Resin A, 184 grams of Resin B, 45.5 grams of styrene, and 1 percent by weight of benzoyl peroxide as catalyst and/or polymerization initiator was blended with one another to form a casting resin containing 35 percent by weight styrene. The mixture was poured into a 10 x 10 square glass dish to form a layer ⅛ inch deep. The resin layer was cured by heating it in an oven at about 120° C. for 4 hours. The cured product had the properties listed under the heading C below.

(D) For purposes of comparison a polyester resin was prepared from a mixture of 2,2-bis(bromomethyl)-1,3-propanediol, propylene glycol, and maleic and phthalic anhydrides employing procedure as follows:

A charge of 453.26 grams (1.73 moles) of 2,2-bis(bromomethyl)-1,3-propanediol, 245.48 grams (3.23 moles) of propylene glycol, 220.5 grams (2.25 moles) of maleic anhydride, and 333 grams (2.25 moles) of phthalic anhydride were placed in a glass reaction vessel similar to that employed above. The mixture was heated at a temperature of 170° C. for a period of 10 hours. The reacted mixture had an acid number of 48.2. The mixture was cooled to about 140° C., after which 0.9 gram of hydroquinone and 580 grams of styrene were added. The mixture contained 15 percent by weight bromine and consisted of 35 percent by weight styrene and 65 percent polyester.

A portion of the mixture was cured using procedure similar to that employed in part C above. The properties of this cured product are listed under D below.

| Cured Resin | C | D |
| --- | --- | --- |
| Tensile Strength, lbs./sq. in | 7,120 | 4,320 |
| Flexural Strength | 14,600 | 12,000 |
| Yellowness [1] | 8 | 25 |

[1] Change in yellowness after 270 hours exposure in a Weather-O-Meter

EXAMPLE 2

In each of a series of experiments, a charge of the batch of the polyester resin prepared in part A of Example 1 was mixed with a charge of the batch of the polyester resin prepared in part B of Example 1, and with styrene in an amount as stated in the following table to form compositions containing 35 percent by weight of styrene and varying amounts of bromine. The resulting mixture was blended with 1 percent by weight of benzoyl peroxide as catalyst. The mixture was poured into a 10 x 10 inch square glass dish to form a layer ⅛ inch deep. The resin layer was cured in an oven at 120° C. for 4 hours. Table 1 identifies the experiments and gives the properties determined for the cured composition.

styrene was mixed with 163 grams of Resin B above and 31.6 grams of methyl methacrylate. The resulting mixture was blended with 1 percent by weight of benzoyl peroxide, then was poured into a 10 x 10 inch square glass dish to form a layer ⅛ inch deep and was cured by heating in an air oven at 120° C. for 4 hours. The cured product had an initial yellowness of 2.6, a final

TABLE I

| Run No. | Starting Materials | | | | Product | | | |
|---|---|---|---|---|---|---|---|---|
| | Resin A, grams | Resin B, grams | Styrene, percent | Bromine, percent | Tensile Strength, lbs./sq. in. | Flexural Strength, lbs./sq. in. | Time, min. | Rate, in./min. |
| 1[1] | 0 | 300 | 35 | 0 | 7,030 | 16,000 | 3.4 | 0.9 |
| 2 | 50 | 245.3 | 35 | 5 | 7,400 | 13,900 | 4.4 | 0.7 |
| 3 | 100 | 191.7 | 35 | 10 | 6,930 | 13,200 | 5.8 | 0.5 |
| 4 | 200 | 184 | 35 | 15 | 7,120 | 14,600 | Self-extinguishing | |
| 5[1] | 250 | 105 | 35 | 20 | 4,300 | 7,150 | Self-extinguishing | |

[1] These experiments are included for prupose of comparison, and are outside the socpe of the invention.

EXAMPLE 3

(A) A charge of 1310 grams (5 moles) of 2,2-bis(bromomethyl)-1,3-propanediol; 220.5 grams (2.25 moles) of maleic anhydride; 333 grams (2.25 moles) of phthalic anhydride; and 350 ml. of ortho-xylene as solvent and reaction medium was placed in a glass reaction vessel equipped with a reflux condenser and stirrer, a trap for the removal of water from the reaction by azeotropic distillation as it was formed, and a stirrer. The mixture was stirred. It was heated at reflux temperatures of 165–170° C. for a period of 7.5 hours while separating water, formed in the reaction; by azeotropic distillation. The reacted mixture had an acid number of 20.2. The ortho-xylene was separated from the product by heating the reacted mixture to a temperature of 170° C. at absolute pressures ranging from atmospheric pressure to about 5 millimeters of Hg or lower. The residue was cooled to about 140° C. There was obtained 1880 grams of polyester resin product. It contained 42.5 percent by weight of bromine. The polyester resin product was mixed with 864 grams of monomeric styrene to form a final product consisting of 31.2% by weight styrene and 68.8% of the bromine-containing polyester. This polyester resin-styrene mixture is identified herein as Resin A. It contained 29.2 percent by weight of bromine.

(B) A charge of 382 grams of propylene glycol, 221 grams of maleic anhydride and 333 grams of phthalic anhydride, was placed in the glass reaction vessel employed in part A above. The mixture was stirred and heated at a temperature of 196° C. for a period of 12 hours while removing water vapors from the reaction as it was formed. A total of 71 grams of water were collected. The polyester resin product had an acid number of 22 and weighed 865 grams. The polyester resin was mixed with 580 grams of monomeric styrene to form a final product consisting of 40 percent by weight of styrene and 60 percent by weight polyester resin. This non-bromine-containing polyester-styrene mixture is identified herein as Resin B.

(C) A charge of 100 grams of Resin A above was mixed with 93.6 grams of Resin B above to form new resin mixture C. This mixture was blended with 1 percent by weight of benzoyl peroxide as polymerization initiator. The resulting mixture was poured into a 10 x 10 inch square glass dish to form a layer ⅛ inch deep. The resin layer was cured by heating it in an air oven at 120° C. for a period of 4 hours. Test pieces were cut from the cured resin plate and were exposed in a Weather-O-Meter for a period of 270 hours. The cured resin had an initial yellowness of 2.3 and a final yellowness of 9.9 after 270 hours in the Weather-O-Meter. The ΔY or change in yellowness was 7.6.

EXAMPLE 4

A charge of 100 grams of a bromine-containing polyester-styrene mixture similar to that of Resin A in Example 3 and consisting of 32.4 percent by weight of yellowness of 8.2 after 270 hours exposure in a Weather-O-meter and a ΔY yellowness of 5.6.

EXAMPLE 5

A charge of 200 grams of a bromine-containing polyester-styrene mixture similar to that of Resin A in Example 1 and consisting of 32.4 percent by weight of styrene was mixed with 191 grams of a polyester resin prepared from 221 grams of maleic anhydride, 333 grams of phthalic anhydride and 520 grams of 2,2-dimethylpropane-1,3-diol employing procedure similar to that employed in part B of Example 3, and which final polyester product contained 33.2 percent by weight of styrene. The resulting mixture was blended with 3.9 percent by weight of benzoyl peroxide, then was poured into a 10 x 10 inch glass dish to form a layer ⅛ inch deep. The resin mixture was cured by heating it in an air oven at 120° C. for 4 hours. The cured product had an initial yellowness of 5.4, a final yellowness of 13.1 after exposure for 270 hours in a Weather-O-Meter and a ΔY yellowness of 7.7. The cured product had a tensile strength of 6,700 lbs./sq. in. and a flexural strength of 14,800 lbs./sq. in.

EXAMPLE 6

A charge of 210 grams of a bromine-containing polyester-styrene mixture similar to that of Resin A in Example 3 and containing 32.4 percent by weight of styrene was mixed with 200 grams of a polyester resin prepared from 264.5 grams (2.7 moles) of maleic anhydride, 670 grams (5.0 moles) of dipropylene glycol and 267 grams (1.8 moles) of phthalic anhydride employing procedure similar to that employed in part B of Example 3, and which final polyester product contained 36 percent by weight of ortho-chlorostyrene, 4 percent styrene and 60 percent polyester resin. The resulting mixture was blended with 1 percent by weight of benzoyl peroxide, then was cast in a mold to form a layer ⅛ inch deep. The layer was cured by heating it in an air oven at 120° C. for 4 hours. The cured product had a tensile strength of 5,700 lbs./sq. in., a flexural strength of 16,200 lbs./sq. in. and an initial yellowness of 10.3. The yellowness after 270 hours exposure in a Weather-O-Meter was 26.5. Test pieces of the cured product were self-extinguishing in less than 20 seconds, when ignited in a flame and the flame removed.

EXAMPLE 7

A charge of 150 grams of a bromine-containing polyester-styrene mixture similar to that of Resin A in Example 1 and containing 32.4 percent by weight styrene was mixed with 143 grams of a polyester resin prepared from 221 grams of maleic anhydride, 333 grams of isophthalic acid 380 grams of propylene glycol employing procedure similar to that employed in part B of Example 1, and which final polyester product consisting of 60 percent by weight of polyester and 40 percent of ortho-chlorostyrene. The resulting mixture was blended with 1 percent by weight of benzoyl peroxide, then was cured by heating a thin layer in an air oven at 120° C. for 4 hours to form a sheet ⅛ inch thick. The cured product had a tensile strength of 11,000 lbs./sq. in., a flexural strength of 20,000 lbs./sq. in. and an initial yellowness of 6.6. The yellowness after 270 hours exposure in a Weather-O-Meter was 19.6. Test pieces of the cured product were self-extinguishing when ignited in a flame and the flame removed.

We claim:

1. A polymerizable composition comprising (A) from 10 to 40 percent by weight of a polyester of 2,2-bis(bromomethyl)-1,3-propanediol and a mixture of at least one aliphatic unsaturated dicarboxylic acid or its anhydride having from 4 to 5 carbon atoms in the molecule and an aromatic dicarboxylic acid selected from the group consisting of phthalic acid and hydrogenated phthalic acid and their anhydrides, in which mixture the molar ratio of aliphatic acid to aromatic acid is from 3:1 to 1:2, (B) from 30 to 60 percent by weight of a non-halogen containing unsaturated polyester of an aliphatic polyol and an unsaturated dicarboxylic acid or anhydride or a mixture of said acid and said anhydride and an aromatic carbocyclic dicarboxylic acid and (C) from 25 to 60 percent by weight of a copolymerizable monomer selected from the group consisting of (a) monovinyl aromatic compounds having the general formula

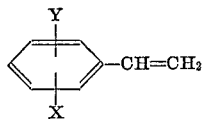

wherein X and Y each represent a member of the group consisting of hydrogen, halogen and alkyl radicals containing from 1 to 4 carbon atoms, and (b) unsaturated esters having the general formula

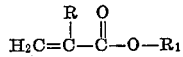

wherein R is a member of the group consisting of hydrogen and the methyl radical and $R_1$ is an alkyl radical containing from 1 to 8 carbon atoms.

2. A composition as claimed in claim 1 wherein the copolymerizable monomer is a monovinyl aromatic compound.

3. A polymerizable composition as claimed in claim 1, wherein the polyester (A) is a polyester of a mixture of maleic anhydride and phthalic anhydride.

4. A composition as claimed in claim 2, wherein the copolymerizable monomer is styrene.

References Cited

UNITED STATES PATENTS

| | | | |
|---|---|---|---|
| 2,140,481 | 12/1938 | Rose et al. | 260—633 |
| 2,822,340 | 2/1958 | McGovern et al. | 260—869 |
| 3,060,146 | 10/1962 | Wismer et al. | 260—869 |
| 3,274,293 | 9/1966 | Elfers et al. | 260—869 |
| 3,285,995 | 11/1966 | Nametz et al. | 260—865 |
| 3,387,060 | 6/1968 | Kokorudz et al. | 260—869 |

FOREIGN PATENTS

| | | |
|---|---|---|
| 630,861 | 11/1961 | Canada. |
| 824,491 | 12/1959 | Great Britain. |
| 138,051 | 5/1960 | U.S.S.R. |

OTHER REFERENCES

Burton, G. W., Flame Retardant Laminates, SPI Reports TP 1105S6, February 1961, pp. 6F–1, 6F–2, 6F–3. 260/869.

MURRAY TILLMAN, Primary Examiner

P. LIEBERMAN, Assistant Examiner

U.S. Cl. X.R.

260—75, 633, 861